United States Patent [19]
Pettitt

[11] Patent Number: 5,459,528
[45] Date of Patent: Oct. 17, 1995

[54] VIDEO SIGNAL PROCESSOR AND METHOD FOR SECONDARY IMAGES

[75] Inventor: Gregory S. Pettitt, Rowlett, Tex.

[73] Assignee: Texas Instruments Incorporated, Dallas, Tex.

[21] Appl. No.: 221,725

[22] Filed: Mar. 31, 1994

[51] Int. Cl.$^6$ .................................................. H04N 5/262
[52] U.S. Cl. ........................ 348/568; 348/588; 348/566; 348/565
[58] Field of Search ........................... 348/565, 566–567, 348/568, 445, 458, 564, 561, 562, 588, 596

[56] References Cited

U.S. PATENT DOCUMENTS

| | | | |
|---|---|---|---|
| 4,656,515 | 4/1987 | Christopher | 348/565 |
| 4,827,348 | 5/1989 | Naimpally | 348/565 |
| 5,047,857 | 9/1991 | Duffield et al. | 345/561 X |

OTHER PUBLICATIONS

Phillips and Nagel, "Digital Control System Analysis and Design", 1990 p. 94.

Primary Examiner—Victor R. Kostak
Assistant Examiner—Nathan J. Flynn
Attorney, Agent, or Firm—Julie L. Reed; Richard L. Donaldson; Rene E. Grossman

[57] ABSTRACT

A processing unit (13) for providing secondary images in a video display system (10) in accordance with a choice of scaling ratios. The processing unit (13) scales the luminance component of an analog input signal by first using an analog low pass filter (22) for anti-aliasing, and then sampling (23) the data at a rate appropriate for the selected scaling ratio. The sampled data is processed by a digital filter (24), on a line-by-line basis, which provides weighted average values derived from the sampled data, on a line-by-line basis. A formatter (25) combines sampled chrominance data with the filtered luminance data, and selects lines for inclusion in the secondary image.

17 Claims, 4 Drawing Sheets

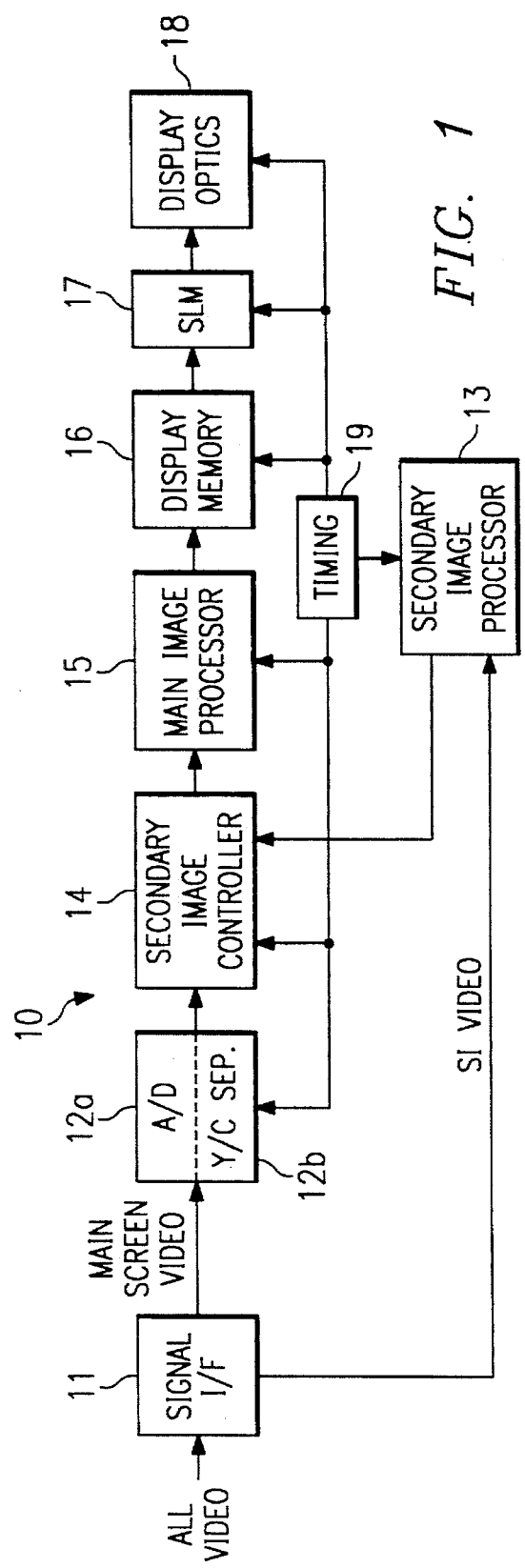
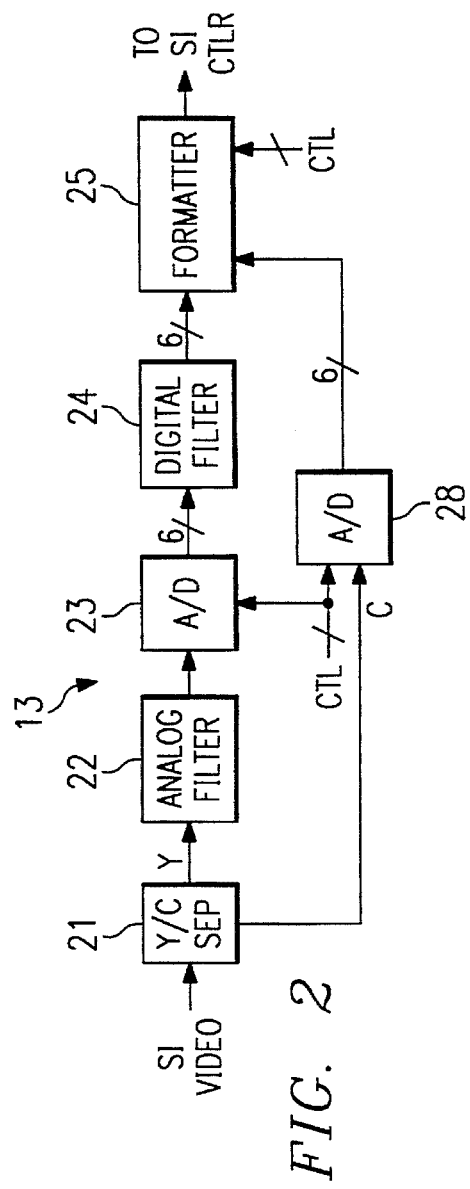

VIDEO SIGNAL PROCESSOR AND METHOD FOR SECONDARY IMAGES

TECHNICAL FIELD OF THE INVENTION

This invention relates to video display systems, and more particularly to providing a secondary image, such as a picture-in-picture, with a main display screen of a digital display system.

BACKGROUND OF THE INVENTION

A feature of many video display systems is the ability to display a picture-in-picture (PIP), which is a small frame within the main image frame, usually of a scaled down image from a different signal. Other types of secondary images are also possible. For example, some display screens are sized for an image having a 16:9 aspect ratio. However, if such a screen is used to display an image with a 4:3 aspect ratio, the remaining area on the side could be used to display a "stack" of small images. This latter feature is sometimes referred to as a picture-on-picture (POP) display.

For displaying these secondary images, a signal that would otherwise be displayed as the main image is scaled down to a smaller size. Typical ratios of the size of the secondary image to the size of the main image are 1:9 and 1:16. For 1:9 scaling, the vertical size and horizontal size are each reduced to ⅓ of the main image size. Likewise, for 1:16 scaling, the vertical and horizontal sizes are each reduced to ¼ of the main image size. If the same display system is to provide both levels of scaling, conventional systems use expensive processors to implement different digital filtering functions, or they use different hardware for different filters.

SUMMARY OF THE INVENTION

One aspect of the invention is a processing unit for providing data for a secondary image in accordance with a selected scaling ratio. The processing unit is used in a display system that receives an analog video input signal having luminance and chrominance components. An analog filter receives the luminance component of said input signal and implements an anti-aliasing function by filtering out frequencies above a predetermined value. A first analog-to-digital-converter receives the filtered signal from the analog filter, and is programmable with at least two different sampling rates, each corresponding to a scaling ratio. A digital filter receives sampled data from the first analog-to-digital converter, on a line-by-line basis, and provides values representing weighted averages of said sampled data on adjacent lines. A second analog-to-digital converter receives the chrominance component of the input signal and is also programmable with at least two different sampling rates. A formatter combines the Y and C data by selecting lines of data values from the digital filter and lines of data values from the second analog-to digital converter. The formatter is programmable with at least two different formatting processes, each corresponding to a different scaling ratio.

A technical advantage of the invention is that it provides data for secondary images with a minimum of hardware, while maintaining picture quality. The same hardware can be used for a variety of different scaling ratios, including the widely used 1:9 and 1:16 scaling ratios.

BRIEF DESCRIPTION OF THE DRAWINGS

FIG. 1 is a block diagram of a display system having a secondary image processor in accordance with the invention.

FIG. 2 is a block diagram of the secondary image processor of FIG. 1.

DETAILED DESCRIPTION OF THE INVENTION

Figure 3:
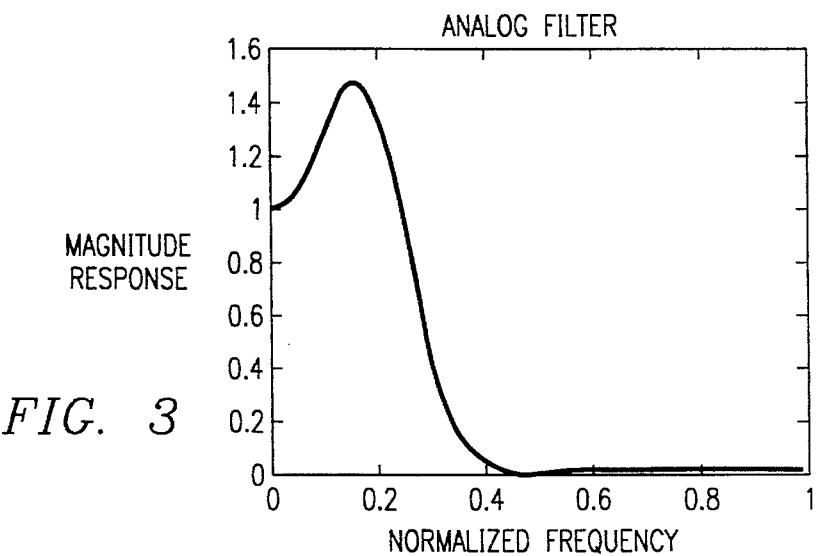
FIGS. 3 and 4 illustrate a response of one implementation of the analog filter of FIG. 2.

The following description is in terms of a video display system that uses a spatial light modulator (SLM) rather than a cathode ray tube (CRT) to generate images. However, the invention could also be used with a CRT display system, or any other display system that receives analog video data and processes the data digitally.

A comprehensive description of a DMD-based digital display system is set out in U.S. Pat. No. 5,079,544, entitled "Standard Independent Digitized Video System", and in U.S. patent Ser. No. 08/147,249, entitled "Digital Television System" and in U.S. patent Ser. No. 08/146,385, entitled "DMD Display System", each assigned to Texas Instruments Incorporated, and each incorporated by reference herein.

U.S. patent Ser. No. 07/678,761, entitled "DMD Architecture and Timing for Use in a Pulse-Width Modulated Display System" (Atty Dkt No. TI-15721), describes a method a formatting video data for use with a DMD-based display system and a method of modulating bit-planes of data to provide varying pixel brightness. The general use of a DMD-based display system with a color wheel to provide sequential color images is described in U.S. patent Ser. No. 07/809,816 (Atty Dkt No. TI-16573), entitled "White Light Enhanced Color Field Sequential Projection". These patent applications are assigned to Texas Instruments Incorporated, and are incorporated herein by reference.

FIG. 1 is a block diagram of a display system 10, which receives an analog video signal, such as a broadcast television signal. In the example of this description, an NTSC signal, which is interlaced in even-row and odd-row fields, is assumed. It is also assumed that the input signal is a "color difference" signal, having a luminance component and a color difference component, or some signal other than an RGB signal.

Display system 10 could be any type of equipment for receiving an analog video signal, sampling the signal, processing pixel data, and displaying images represented by the sampled data. Only those components significant to main-screen and secondary-screen data processing are shown.

Other components, such as might be used for processing synchronization and audio signals or for features such as closed captioning, are not shown.

As an overview of the operation of display system 10, signal interface 11 receives an analog video signal and separates video, synchronization, and audio signals. For secondary image displays, signal interface 11 obtains the signal for the main image, and for the secondary image. Although for purposes of example, the rest of this description is in terms of PIP images, the same concepts apply to picture-on-picture (POP) images, which are located beside the main picture rather than overlaid on top of it, or for any other secondary picture which is derived from the video signal and displayed with a reduced size.

Signal interface 11 delivers the video signal for the main image to A/D converter 12a and Y/C separator 12b, which convert the data into pixel-data samples and which separate the luminance ("Y") data from the chrominance ("C") data, respectively. In FIG. 1, the signal is converted to digital data before Y/C separation, but in other embodiments, Y/C separation could be performed before A/D conversion, using analog filters.

Signal interface 11 delivers the video signal for the secondary image to secondary image processor 13. This signal may come from a second tuner for a television signal or from an input from another device such as a video camera/recorder (VCR). As explained below in connection with FIGS. 2–10, secondary image processor 13 scales the data to the desired number of rows and pixels per row. It then delivers the secondary image data to a control unit 14, which inserts the secondary image data into the main image data in the proper location.

Processor system 15 prepares the data for display, by performing various pixel data processing tasks. Processor system 15 includes various memory devices for storing pixel data during processing, such as field and line buffers. The tasks performed by processor system 15 may include linearization, colorspace conversion, and line generation. The line generation process converts interlaced fields having 240 odd-rows or 240 even-rows of data into display frames having 480 rows. The order in which these tasks are performed may vary.

Display memory 16 receives processed pixel data from processor system 15. Display memory 16 formats the data, on input or on output, into "bit-plane" format, and delivers the bit-planes to SLM 16 one at a time. The bit-plane format permits each pixel element of SLM 16 to be turned on or off in response to the value of 1 bit of data at a time. In a typical display system 10, display memory 16 is a "double buffer" memory, which means that it has a capacity for at least two display frames. The buffer for one display frame can be read out to SLM 17 while the buffer another display frame is being written. The two buffers are controlled in a "ping-pong" manner so that data is continuously available to SLM 17.

SLM 17 may be any type of SLM. Although this description is in terms of a DMD-type of SLM 17, other types of SLMs could be substituted into display system 10 and used for the invention described herein. For example, SLM 17 could be an LCD-type SLM. Details of a suitable SLM 17 are set out in U.S. Pat. No. 4,956,619, entitled "Spatial Light Modulator", which is assigned to Texas Instruments Incorporated, and incorporated by reference herein. In the example of this description, SLM 17 has a 640×480 array of mirror elements, each of which is individually addressable. When addressed, the direction in which each mirror tilts, on or off, results in a reflected image.

Display unit 18 has optical components for receiving the image from SLM 17 and for illuminating an image plane such as a display screen. For color displays, the bit-planes for each color could be sequenced and synchronized to a color wheel that is part of display unit 18. Or, the data for different colors could be concurrently displayed on three SLMs and combined by display unit 18. Master timing unit 19 provides various system control functions.

FIG. 2 is a block diagram of secondary image processor 13, which receives an analog Y/C signal representing the secondary image from signal interface 11. As explained below, the same secondary image processor 13 may be used to scale data in accordance with a number of different scaling ratios, with control inputs to an analog filter 22 and a digital filter 24 to select between scaling modes.

Y/C separator 21 separates the Y component of the signal from the C component. If, in the signal path for the main image, as illustrated in FIG. 1, Y/C separator 12a operates on the analog signal rather than on digital data after sampling, the functions of Y/C separator 12a and Y/C separator 21 could be combined in a single unit that operates on both the main image signal and the secondary image signal.

Analog filter 22 receives the Y signal. A feature of the invention is that filter 22 incorporates an anti-aliasing function and a peaking function.

For anti-aliasing, filter 22 filters out high frequency components of the Y signal. For a scaling ratio of 1:16, the horizontal scaling ratio is 1:4. As compared to "smaller" horizontal scaling ratio, such as the 1:3 horizontal ratio for 1:9 scaling, the ¼ ratio is a "maximum" ratio. The value of the high frequency cut-off is no greater than ¼ the high frequency cutoff value for the main image, as determined by Nyquist sampling rates. This satisfies the Nyquist requirements for 1:16 reduction, and permits a single horizontal filter 22 to be used for all anti-aliasing where the horizontal scaling factor is less than 1:4.

For peaking, the higher frequencies of the non-filtered part of the signal are amplified. The optimum amount and range of peaking are somewhat subjective, and may be experimentally derived.

A suitable analog filter 22 is specified with the following function:

$$F_H(s) = \frac{-0.1436s^5 - 6.6638s^4 - 2.4839s^3 - 3.3491s^2 - 4.7695s - 4.1116}{s^5 - 19.9568s^4 - 18.4907s^3 - 24.3213s^2 - 9.7903s - 4.1114}$$

Figure 4:
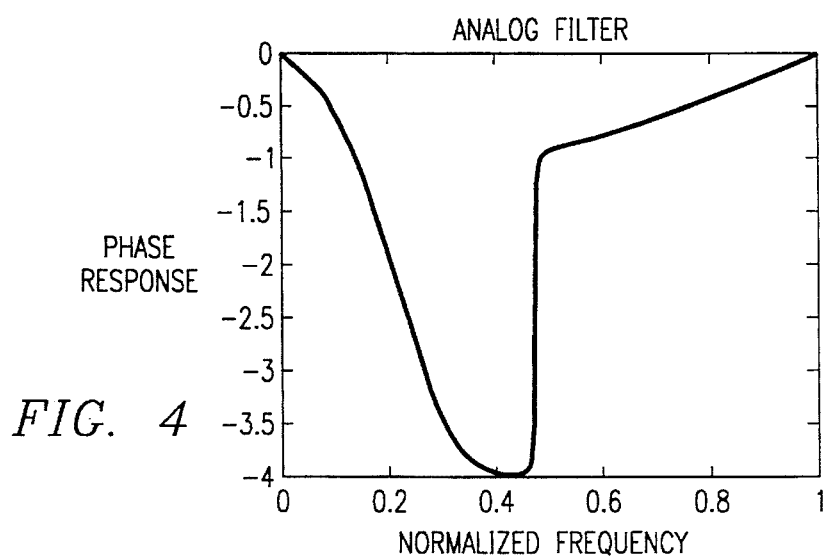

FIGS. 3 and 4 illustrate the amplitude and frequency response of this implementation of filter 22. The maximum peaking is approximately 150% and is at the mid-frequency range of the low-passed signal.

Referring again to FIG. 2, the low-pass filtered Y signal is received by A/D converter 23. A/D converter 23 has at least two sampling frequencies, one for 1:9 scaling and one for 1:16 scaling. It could also have other selectable sampling frequencies, depending on how many horizontal scaling factors are desired to be supported. As indicated by the CTL input to A/D converter 23, the desired sampling frequency can be varied by selecting a clock input. The sampling frequency, assuming one sample per pixel, can be determined from the scaling ratio, the number of pixels per line in the main image, and the line rate. For example, for a display having a main image of 640 pixels per line, a 1:9 scaling ratio has a horizontal scaling ratio of 1:3, for 213

(640/3) samples per line. This value is multiplied by the line rate (lines per second), to obtain the sample frequency (samples per second). For 1:9 and 1:16 scaling, A/D converter 23 runs at ⅓ or ¼ the frequency of A/D converter 12b, respectively.

The effect of low pass filter 22 and A/D converter 23 is that of a "horizontal decimation filter" such that the Y signal is now represented by the correctly scaled number of samples per line. However, at this point, the data represents an unscaled number of lines per field. Each even or odd field of data has the same number of lines as the main image, as determined by the horizontal sync signals.

For vertical scaling, the data is received by digital filter 24, which implements a vertical filtering function. Filter 24 operates on sets of three adjacent lines of data. For every input line, filter 24 provides an output line that is a weighted average of that line, the line above it, and the line below it. If incoming video signal represents interlaced fields, vertical filter 24 operates on sets of three successive odd lines of an odd field or three successive even lines of an even field.

A transfer function for a suitable filter 24 is:

$$F(z) = \tfrac{1}{4}z^0 + \tfrac{1}{2}z^{-1} + \tfrac{1}{4}z^{-2},$$

where exponents of the values, $z^0$, $z^{-1}$ and $z^{-2}$ represent the time-delays of the three adjacent lines. The current line is represented by a set of values with a delay of 0, a previous line is represented by a set of values with a delay of $-1$, and a second previous line is represented by a set of values with a delay of $-2$. This filter function is referred to herein as a "three-line average" filter function.

Figure 5:
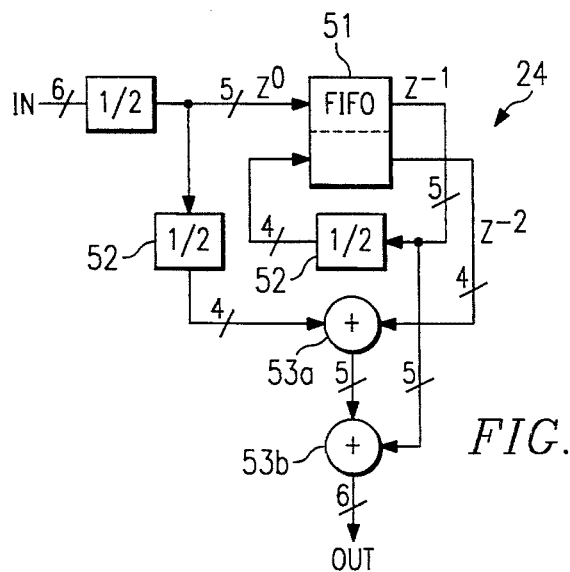
FIG. 5 illustrates the digital filter of FIG. 2.

FIG. 5 is a block diagram of a vertical filter 24 that implements the transfer function in the preceding paragraph. For purposes of example, it is assumed that the data has been sampled as 6-bit values. A feature of the invention is the implementation of the filter coefficients (½ and ¼) by dropping the least significant bit (LSB) along the data path. Thus, at various points in the filter, as indicated by the "½" function, a LSB is dropped. Where 6-bit data is ordered from LSB to MSB, dropping the LSB results in retention of the "last" 5 bits. Likewise, this same 5-bit value can be further divided by ½ by retaining its "last" 4 bits.

A 9-bit first-in first-out (FIFO) memory 51 stores the last 5 bits of each sample of a previous line in a 5-bit memory area. FIFO 51 also stores the last 4 bits of each sample of a second previous line in a 4-bit memory area. Two adders 53a and 53b sum values derived from each of the three lines.

In operation, for each current line's cycle, filter 24 divides the 6-bit data samples of that line by 2, thereby providing 5-bit current-line values. These 5-bit current-line values are delivered to FIFO 51, where they are stored for the next cycle's previous line values. Meanwhile, the 5-bit previous-line values in FIFO 51 become 4-bit second-previous-line values after being divided by 2 and stored in the 4-bit area of FIFO 51.

At the filter input, the 5-bit current line values are further divided by 2 to become 4-bit current line values and delivered to adder 53a as the first term of the filter function. The 5-bit previous-line values are moved from FIFO 51 to adder 53b as the second term of the filter function. The 4-bit second-previous-line values are moved from FIFO 51 to adder 53a as the third term of the filter function.

The output of filter 24 is a set of 6-bit values representing weighted averages of the input lines. As stated above, every input line results in an output line. Because the reduction of the number of lines is performed after the filtering, the same vertical filter 24 is used for various levels of scaling.

Referring again to FIG. 2, the filtered data is delivered to formatter 25. Formatter 25 also receives chrominance data, which has been sampled at a rate appropriate for the scaling level. There are various methods for handling the chrominance data. FIG. 2 illustrates a simple method, in which the chrominance data is sampled by a separate A/D converter 28. Although not illustrated, alternative methods for handling chrominance data might include filtering the signal for anti-aliasing, and using a single A/D converter for both luminance and chrominance data.

Formatter 25 determines which lines of data are to be included in the secondary image. It also spatially aligns the data so as to provide a substantially even spacing between lines. As explained below in connection with FIGS. 6–8 and FIG. 10, different scaling ratios call for different formatting processes. A CTL input determines which formatting process formatter 25 will perform. As is clear from the following descriptions of these processes, formatter 25 may be implemented with scaled-down field memory and selectable timing means that count the desired number of line intervals. An example of an implementation of formatter 25 is described below in connection with FIG. 11.

Figure 6:
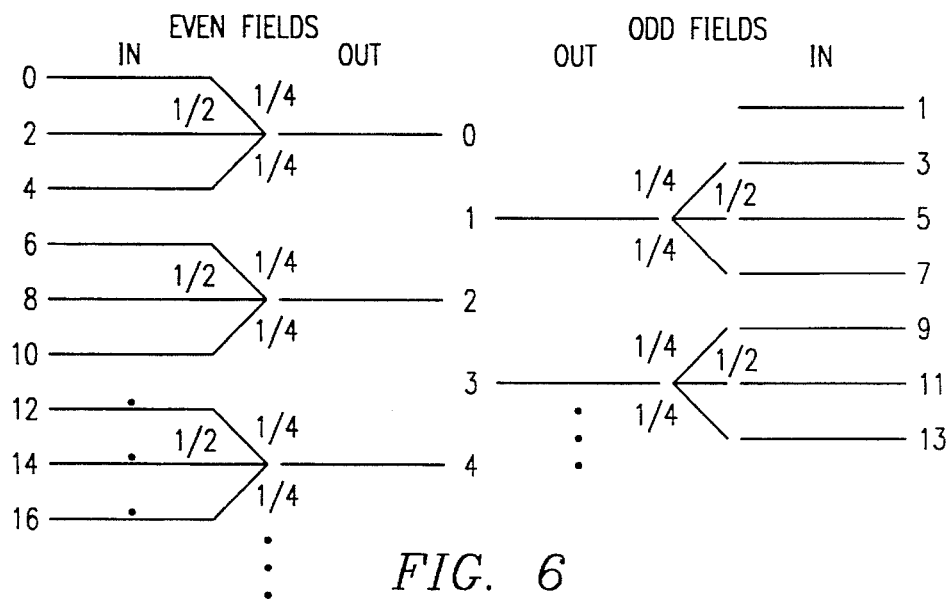
FIG. 6 illustrates how data from the filter of FIG. 5 is formatted for 1:9 scaling.

FIG. 6 illustrates the formatting process for 1:9 scaling. For even fields, formatter 25 selects the first output line, which represents the weighted average of lines 0, 2, and 4. Thereafter, formatter 25 selects every third succeeding output line. The result is a set of weighted average lines, which includes the lines that more heavily weight lines 2, 8, 14 . . . . For odd fields, formatter 25 selects the second output line, which represents the weighted average of lines 3, 5, and 7. Thereafter, formatter 25 selects every third succeeding output line. The result is a set of output lines, which includes the lines that more heavily weight lines 5, 11, 17, . . .

Figure 7:
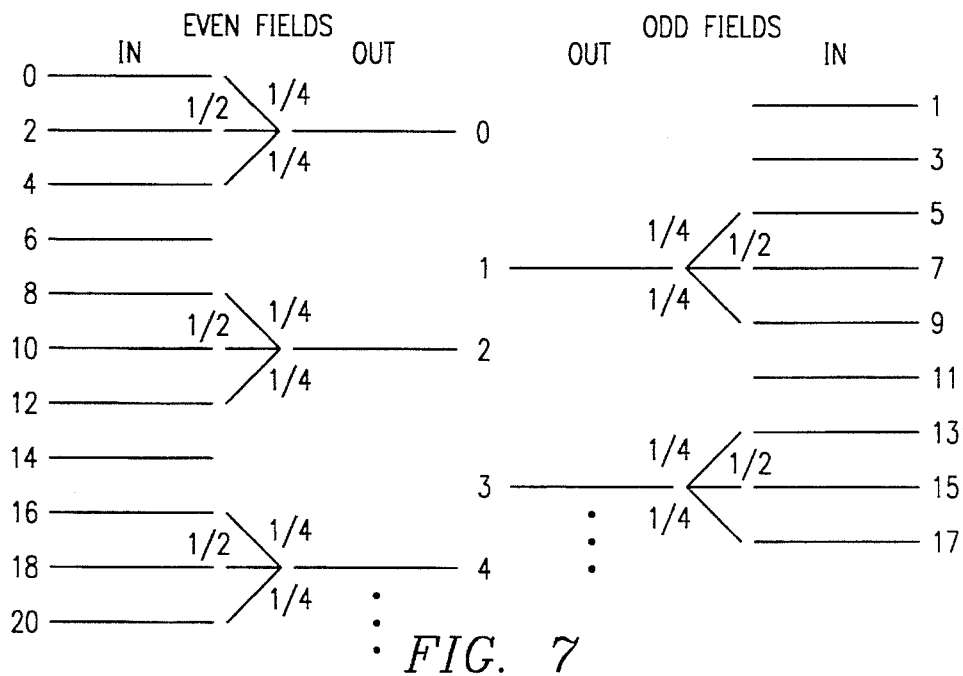
FIG. 7 illustrates how data from the filter of FIG. 5 is formatted for 1:16 scaling.

FIG. 7 illustrates the formatting process for 1:16 scaling. For even fields, formatter 25 selects the first output line and every fourth succeeding output line. For odd fields, formatter 25 selects the third output line and every fourth succeeding output line.

Figure 8:
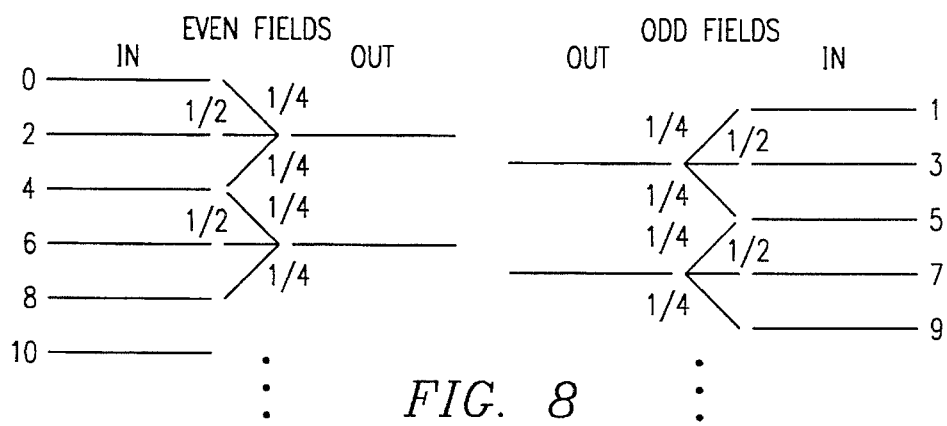
FIG. 8 illustrates how data from the filter of FIG. 5 is formatted for 1:4 scaling.

FIG. 8 illustrates an alignment process for 1:4 scaling, which uses the output of filter 24. For even fields, formatter 25 selects the first output line and every other succeeding output line. For odd fields, formatter 25 selects the first output line and every other succeeding output line.

The selected lines of Y/C data from formatter 25 are delivered to secondary image control unit 14 on a scaled-down field-by-field basis. Control unit 14 may include memory to correct any temporal disparity between incoming fields of the main image and the secondary image.

Figure 9:
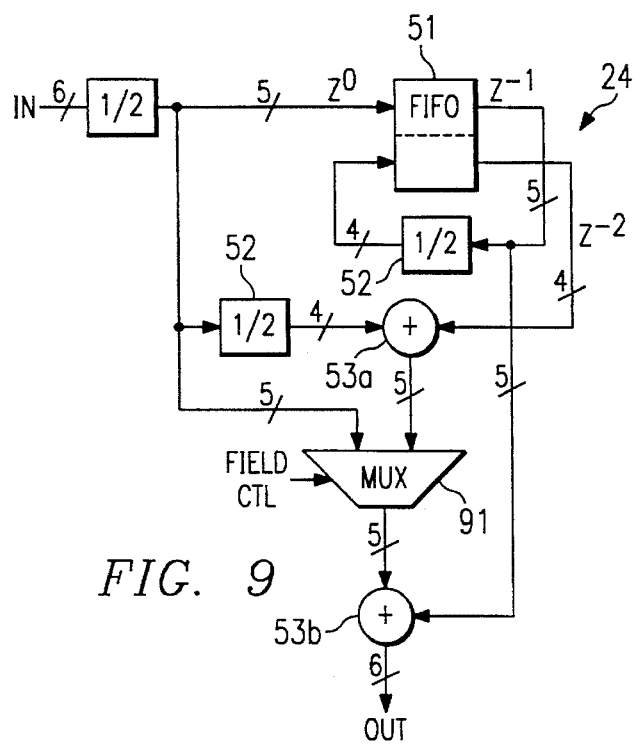
FIG. 9 illustrates a different embodiment of the digital filter of FIG. 5, used to provide data for 1:4 scaling as well as 1:9 and 1:16 scaling.

FIG. 9 illustrates an alternative embodiment of filter 24, especially modified to provide data for 1:4 scaling. The filter 24' operates in the same manner as the filter 24 of FIG. 5, but has a multiplexer 91 to permit the filter output to be data representing either the three-line average function described above or the following two-line average function:

$$H(z) = \tfrac{1}{2}z^0 + \tfrac{1}{2}z^{-1}.$$

Figure 10:
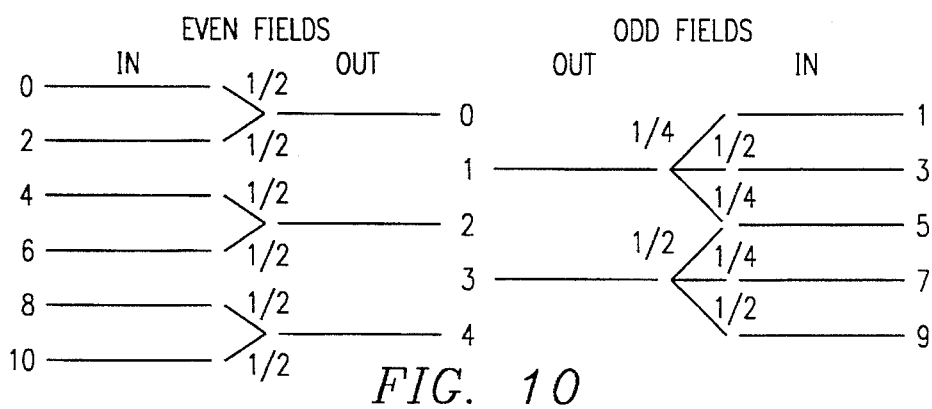
FIG. 10 illustrates how data from the digital filter of FIG. 9 is formatted for 1:4 scaling.

FIG. 10 illustrates the alignment process performed by formatter 25 for 1:4 scaling when the filter 24' of FIG. 9 is used. For even fields, formatter 25 uses the two-line average data, and selects the first output line and every other succeeding output line. For odd fields, formatter 25 uses the three-line average data, and selects the first output line and every other succeeding output line.

Figure 11:
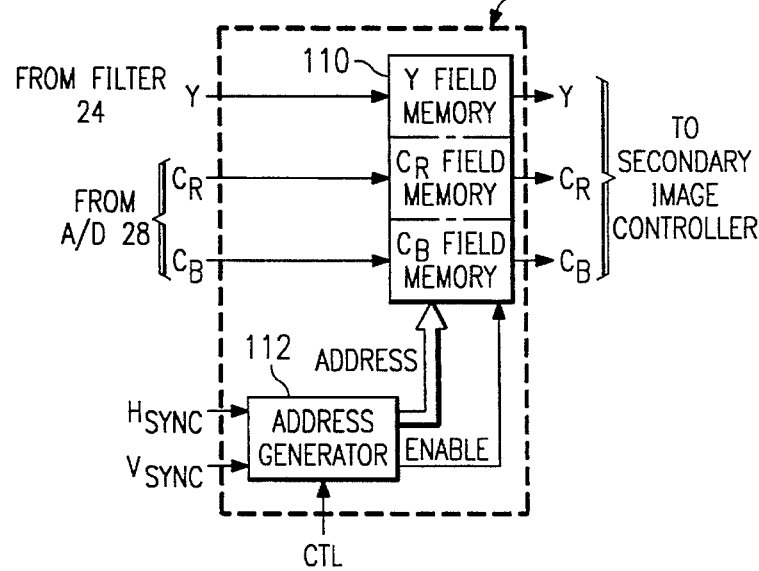
FIG. 11 illustrates an implementation of the formatter of FIG. 2.

FIG. 11 is a block diagram of one implementation of formatter 25. A dual ported memory 110 stores fields of Y, Cr, and Cb data, so that data from the same fields can be combined. Although the Cr and Cb data is shown as having separate field memories, one field memory could be eliminated if the Cr and Cb data is interleaved and properly subsampled (4:2:2). An address generator 112 receives vertical and horizontal sync signals, or signals derived therefrom via timing unit 19, and generates addresses so that memory 110 provides the proper data at the proper time. The Y/C data for a secondary image is delivered to secondary image controller 14, which insert the secondary image into the main image, or otherwise places it in the display frame, provides field data to processor 15.

OTHER EMBODIMENTS

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A processing unit for providing data for a secondary image in accordance with a selected one of at least two different scaling ratios, for use in a display system that receives an analog video input signal, comprising:

an analog filter for receiving a luminance component of said analog input signal, and for implementing an anti-aliasing function by filtering out frequencies above a predetermined frequency cutoff value;

an analog-to digital-converter for receiving the filtered signal from said analog filter, said analog-to-digital converter being programmable with at least two different sampling rates;

a digital filter for receiving sampled data from said analog-to-digital converter, on a line-by-line basis, and for providing values representing weighted averages of said sampled data, on said line-by-line basis; and a formatter for receiving lines of data values from said digital filter and for selecting lines to be included in said secondary image, said formatter being selectable between at least two different formatting processes, and wherein said formatter combines said data values from said digital filter with scaled chrominance data values.

2. The processing unit of claim 1, wherein said analog filter further implements a peaking function for increasing the amplitude of selected components below said predetermined frequency cutoff value, wherein said components are selected based upon frequency of those components.

3. The processing unit of claim 1, wherein said predetermined frequency cutoff value is determined by the greater of said at least two different sampling rates.

4. The processing unit of claim 1, wherein said input data is interlaced field data, and wherein said formatter selects said lines according to whether they are in even or odd fields.

5. The processing unit of claim 1, wherein said digital filter provides values representing weighted averages of the sampled data on three adjacent lines.

6. The processing unit of claim 5, wherein said digital filter alternatively provides values representing weighted averages of the sampled data on two adjacent lines.

7. The processing unit of claim 1, wherein said digital filter implements a filtering function having coefficients of ½ and ¼ and wherein said coefficients are implemented by dropping a least significant bit of said sampled data.

8. The processing unit of claim 1, wherein said digital filter comprises a single first-in, first-out memory for storing previous line and second previous line values, and two adders.

9. The processing unit of claim 1, further comprising a second analog-to-digital converter for receiving the chrominance component of said input signal, said second analog-to digital converter being programmable with at least two different sampling rates.

10. A method of providing data for a secondary picture scaled to a smaller size than a main image, in accordance with a choice of scaling ratios, to be displayed on a video display system, comprising the steps of:

selecting a scaling ratio;

receiving an analog input signal having luminance and chrominance components;

filtering the analog luminance component of said signal with an analog filter that implements an anti-aliasing filter function, thereby providing a filtered analog luminance signal;

sampling said filtered analog luminance signal at a rate determined by said scaling ratio, thereby providing sampled luminance values;

filtering said sampled luminance values, on a line-by-line basis, with a digital filter, thereby providing weighted average lines of said sampled luminance values;

sampling from said chrominance signal at said rate determined by said horizontal scaling ratio, thereby providing sampled chrominance values;

combining said weighted average lines of said sampled luminance values and said sampled chrominance value, thereby providing Y/C weighted average lines; and selecting from said Y/C weighted average lines, lines for use in said secondary image, in accordance with a formatting process that is determined by said scaling ratio.

11. The method of claim 10, wherein said analog filter of said filtering step further implements a peaking function for raising the amplitude of selected frequencies of said filtered analog luminance signal.

12. The method of claim 10, wherein said analog filter of said filtering step implements an anti-aliasing function that filters out frequencies above a cutoff value determined by the largest horizontal scaling ratio of said scaling ratios.

13. The method of claim 10, wherein said digital filter of said filtering step implements a filtering function having at least one coefficient of ½ and wherein said filtering is accomplished by dropping the least most significant bit of said sampled luminance values.

14. The method of claim 10, wherein said digital filter of said filtering step provides weighted average lines derived from sets of three adjacent lines.

15. The method of claim 14, wherein said digital filter is implemented with a first-in, first-out memory and two adders.

16. The method of claim 14, wherein said digital filter alternatively provides weighted average lines derived from sets of two adjacent lines.

17. A processing unit for providing a secondary image in accordance with a selected one of at least two different scaling ratios, for use in a display system that receives an analog video input signal, comprising:

an analog filter for receiving a luminance component of said analog input signal, and for implementing an anti-aliasing function by filtering out frequencies above a high frequency cutoff value;

an first analog-to digital-converter for receiving the filtered signal from said analog filter, said analog-to-digital converter being programmable with at least two different sampling rates;

a digital filter for receiving sampled data from said first analog-to-digital converter, on a line-by-line basis, and for providing values representing weighted averages of said sampled data, on said line-by-line basis, said digital filter operating on sets of three adjacent lines and having a first-in, first-out memory for storing a previous line and a second previous line, and wherein said digital filter implements a function having at least one coefficient of ½, which is implemented by dropping a least significant bit of said sampled data;

a second analog-to-digital converter for receiving the chrominance component of said input signal, said second analog-to digital converter being programmable with at least two different sampling rates; and a formatter for combining lines of data values from said digital filter and lines of data values from said second analog-to digital converter, and for selecting lines to be included in said secondary image, said formatter being programmable with at least two different formatting processes.

* * * * *